(12) United States Patent
Papakipos et al.

(10) Patent No.: US 8,787,939 B2
(45) Date of Patent: Jul. 22, 2014

(54) DYNAMIC GEOGRAPHIC BEACONS FOR GEOGRAPHIC-POSITIONING-CAPABLE DEVICES

(75) Inventors: Matthew Nicholas Papakipos, Palo Alto, CA (US); Lev Popov, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 29 days.

(21) Appl. No.: 13/431,842

(22) Filed: Mar. 27, 2012
(Under 37 CFR 1.47)

(65) Prior Publication Data
US 2013/0260795 A1 Oct. 3, 2013

(51) Int. Cl.
*H04W 4/02* (2009.01)

(52) U.S. Cl.
USPC ............................ 455/456.3; 455/456.1

(58) Field of Classification Search
USPC ..................... 455/450, 456.1, 456.3, 574
See application file for complete search history.

(56) References Cited

U.S. PATENT DOCUMENTS

| 8,386,514 | B2 | 2/2013 | Cheng |
| 2006/0064346 | A1 | 3/2006 | Steenstra |
| 2006/0099940 | A1 | 5/2006 | Pfleging |
| 2008/0070593 | A1 | 3/2008 | Altman |
| 2010/0130213 | A1 | 5/2010 | Vendrow et al. |
| 2010/0232329 | A1 | 9/2010 | Park |
| 2011/0142016 | A1 | 6/2011 | Chatterjee |
| 2011/0238755 | A1 | 9/2011 | Khan |
| 2012/0287031 | A1 | 11/2012 | Valko |
| 2012/0317615 | A1 | 12/2012 | Geva |

FOREIGN PATENT DOCUMENTS

| EP | 1441235 A2 | 7/2004 |
| EP | 1903815 A2 | 3/2008 |
| KR | 10-2006-0065339 | 6/2006 |
| WO | 2010-047849 A1 | 4/2010 |

OTHER PUBLICATIONS

International Search Report and Written Opinion for PCT/US2013/028963, Jun. 12, 2013.
U.S. Appl. No. 13/545,229, filed Jul. 10, 2012, Jia.
U.S. Appl. No. 13/416,975, filed Mar. 9, 2012, Papakipos.
U.S. Appl. No. 13/417,013, filed Mar. 9, 2012, Papakipos.
Office Action for U.S. Appl. No. 13/417,013, Feb. 20, 2013.
International Search Report and Written Opinion for PCT/US2013/028961, Jun. 19, 2013.
*USPTO Office Action* for U.S. Appl. No. 13/417,013 to Papakipos, et al., 18 pages.

(Continued)

*Primary Examiner* — Sam Bhattacharya
(74) *Attorney, Agent, or Firm* — Baker Botts L.L.P.

(57) ABSTRACT

In one embodiment, a method includes receiving, at a mobile device, information on one or more entities socially connected to a user, the information including a location for each of the entities and an affinity score; determining on a periodic basis, by one or more processors of a geographic-positioning component of the mobile device, a current location of the mobile device; determining, for each of one or more of the entities, a radius from the location of the entity based at least in part on the affinity score for the entity; determining whether the current location is within an area defined by one of the radii; and, if so, then transmitting by the processors of the geographic-positioning component a message to one or more other processors of the mobile device, causing one or more of the other processors to transition from a sleep state to an active state.

20 Claims, 8 Drawing Sheets

(56) References Cited

OTHER PUBLICATIONS

*Response Pursuant to C.F.R. § 1.111* for U.S. Appl. No. 13/417,013 to Papakipos, et al., ( 8 pgs), Jul. 22, 2013.

*Response Pursuant to C.F.R. § 1.116* for U.S. Appl. No. 13/417,013 to Papakipos, et al., ( 8 pgs), Sep. 30, 2013.
*Notice of Appeal and Pre-Appeal Brief Request for Review*, U.S. Appl. No. 13/417,013, ( 6 pgs), Oct. 31, 2013.
*Appeal Brief*, U.S. Appl. No. 13/417,013, (13 pgs), Dec. 30, 2013.
USPTO, *Office Action*, U.S. Appl. No. 13/416,975, filed Mar. 9, 2012, in re: Matthew Nicholas Papakipos; (13 pgs).

DYNAMIC GEOGRAPHIC BEACONS FOR GEOGRAPHIC-POSITIONING-CAPABLE DEVICES

TECHNICAL FIELD

This disclosure relates generally to geographic-positioning-capable devices.

BACKGROUND

A social-networking system, such as a social networking website, enables its users to interact with it and with each other through the system. The social-networking system may create and store a record, often referred to as a user profile, in connection with the user. The user profile may include a user's demographic information, communication channel information, and personal interest. The social-networking system may also create and store a record of a user's relationship with other users in the social-networking system (e.g., social graph), as well as provide services (e.g., wall-posts, photo-sharing, or instant messaging) to facilitate social interaction between users in the social-networking system. A geo-social-networking system is a social-networking system in which geographic services and capabilities are used to enable additional social interactions. User-submitted location data or geo-location techniques (e.g., mobile phone position logging) can allow a geo-social network system to connect and coordinate users with local people or events that match their interests. For example, users can check-in to a place using a mobile client application by providing a name of a place (or selecting a place from a pre-established list of places). The geo-social-networking system, among other things, can record information about the user's presence at the place and possibly provide this information to other users of the geo-social-networking system.

A geographic location of a mobile device (e.g., a cell phone, a tablet computer) equipped with cellular, Wi-Fi, or GPS (Global Positioning System) capabilities can be identified with geographic-positioning signals obtained by cell tower triangulation, Wi-Fi positioning, or GPS positioning. Such mobile devices may have additional functionalities incorporating geographic location data of the devices, for example, providing driving directions, displaying a map of a current location, or providing information of nearby points of interest such as restaurants, gas stations, etc.

DESCRIPTION OF EXAMPLE EMBODIMENTS

Figure 1:
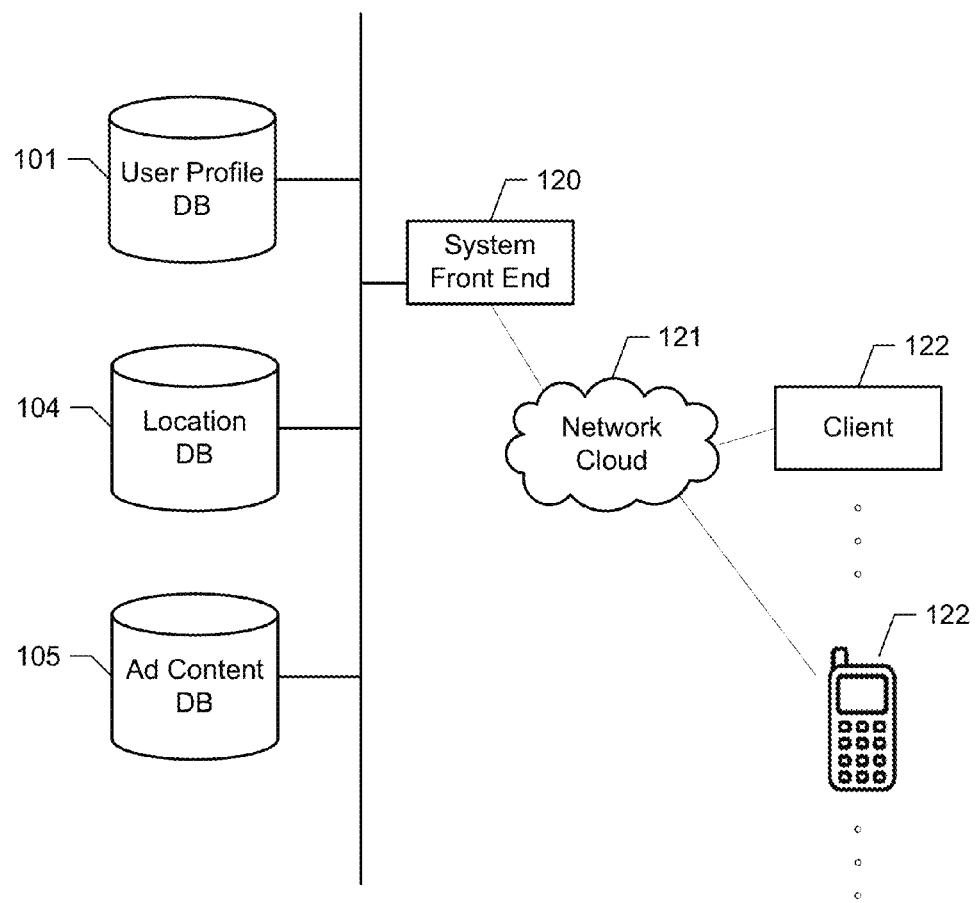
FIG. 1 illustrates an example social-networking system.

A social-networking system, such as a social-networking website, enables its users to interact with it, and with each other through, the system. Typically, to become a registered user of a social-networking system, an entity, either human or non-human, registers for an account with the social-networking system. Thereafter, the registered user may log into the social-networking system via an account by providing, for example, a login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social-networking system, the social-networking system may create and store a record, often referred to as a "user profile", in connection with the user. The user profile may include information provided by the user and information gathered by various systems, including the social-networking system, relating to activities or actions of the user. For example, the user may provide his name, profile picture, contact information, birth date, gender, marital status, family status, employment, education background, preferences, interests, and other demographical information to be included in his user profile. The user may identify other users of the social-networking system that the user considers to be his friends. A list of the user's friends or first degree contacts may be included in the user's profile. Connections in social-networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social-networking system allow the connection to be indirect via one or more levels of connections (e.g., friends of friends). Connections may be added explicitly by a user, for example, the user selecting a particular other user to be a friend, or automatically created by the social-networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social-networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

Social-networking system may maintain a database of information relating to geographic locations or places. Places may correspond to various physical locations, such as restaurants, bars, train stations, airports and the like. In one implementation, each place can be maintained as a hub node in a social graph or other data structure maintained by the social-networking system, as described in U.S. patent application Ser. No. 12/763,171, which is incorporated by reference herein for all purposes. Social-networking system may allow users to access information regarding each place using a client application (e.g., a browser) hosted by a wired or wireless station, such as a laptop, desktop or mobile device. For example, social-networking system may serve web pages (or other structured documents) to users that request information about a place. In addition to user profile and place information, the social-networking system may log or maintain other information about the user. For example, the social-networking system may support geo-social-networking system functionality including one or more location-based services that record the user's location. For example, users may access the geo-social-networking system using a special-purpose client application hosted by a mobile device of the user (or a web- or network-based application using a browser client). The client application may automatically access Global Positioning System (GPS) or other geo-location functions supported by the mobile device and report the user's current location to the geo-social-networking system. In addition, the client application may support geo-social networking functionality that allows users to check-in at various locations and communicate this location to other users. A check-in to a given place may occur when a user is physically located at a place and, using a mobile device, access the geo-social-networking system to register the user's presence at the place. A user may select a place from a list of existing places near to the user's current location or create a new place. The social-networking system may automatically checks in a user to a place based on the user's current location and past location data, as described in U.S. patent application Ser. No. 13/042,357 filed on Mar. 7, 2011, which is incorporated by reference herein for all purposes. An entry including a comment and a time stamp corresponding to the time the user checked in may be displayed to other users. For example, a record of the user's check-in activity may be stored in a database. Social-networking system may select one or more records associated with check-in activities of users at a given place and include such check-in activity in web pages (or other structured documents) that correspond to a given place. The check-in activity may also be displayed on a user profile page and in news feeds provided to users of the social-networking system.

Still further, a special purpose client application hosted on a mobile device of a user may be configured to continuously capture location data of the mobile device and send the location data to social-networking system. In this manner, the social-networking system may log the user's location and provide various recommendations to the user related to places that are proximal to the user's current trajectory or path or that are frequented by the user. In one implementation, a user may opt in to this recommendation service, which causes the client application to periodically post location data of the user to the social-networking system.

In particular embodiments, the social-networking system may receive location data from numerous mobile devices of users of the social-networking system. Location data for each of these mobile devices may be continuously captured by the respective devices (e.g., by special purpose client applications hosted on these mobile devices) and transmitted to the social-networking system. The social-networking system may then log the locations of all of the users whose devices send it location information, and use this information to push notifications to one or more of these users. As an example, a push notification system of the social-networking system may alert the mobile device of a first user that another user of the social network (e.g., a friend or first-degree social contact) is in proximity to the first user. Any suitable criteria may be used by the social-networking system (including, for example, whether two users are friends or contacts, and whether they are first-degree contacts or lesser-degree contacts) to determine which other users are of interest to a particular user and what distance is small enough to the user to be of relevance (e.g., 1 mile if the user is moving slowly, or 10 miles if the user is moving more quickly). Users of the social-networking system may, in certain embodiments, choose to opt in or opt out of receiving these types of push notifications. A user may also define other settings within the social network, including settings to allow or prevent other users from receiving such location-based push notifications based on the first user's location.

A social-networking system may maintain a database of advertising content from advertisers, and generate and communicate advertisements to users of the social-networking system. The social-networking system may increase effectiveness of advertising by providing an advertisement that is targeted to a user who is likely to be interested in the advertisement. U.S. application Ser. No. 12/195,321, incorporated by reference in its entirety for all purposes, describes a system that selects advertisements by matching targeting criteria of advertisements and a user's profile information and past actions, and presents the selected advertisements to the user. The social-networking system may also generate and communicate advertisements to a user based on the user's social graph information. For example, in additional to presenting an advertisement that is targeted to a particular user, the social-networking system may communicate information about the advertisement to other users connected to the particular user. U.S. application Ser. No. 12/193,702 describes a system that selects advertisements for a targeted user by matching targeting criteria of advertisements and past actions of another user connected to the targeted user, and presented information about the matched action and the selected advertisements to the targeted user.

FIG. 1 illustrates an example social-networking system. In particular embodiments, the social-networking system may store user profile data and social-graph information in user profile database 101. In particular embodiments, the social-networking system may store geographic and location data in location database 104. In particular embodiments, the social-networking system may store advertising content and associated information in advertising content database 105. For example, advertising content can include advertising messages and media data (e.g., graphic arts, photos, video clips). For example, information associated with the advertising content can include information about advertisers (e.g., name, URL), business category (e.g., sporting goods, Japanese restaurant, retail clothing), one or more locations, and targeting criteria (e.g., a certain age group, a certain interest). In one implementation, an administrator of a hub node corresponding to a place maintained by the geo-social-networking system may configure one or more advertisements, offers or coupons that may be presented to a user. In particular embodiments, databases 101, 104, and 105 may be operably connected to the social-networking system's front end. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social-networking system. Network cloud 121 generally represents a network or collection of networks (such as the Internet or a corporate intranet, or a combination of both) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system or created by users of the system. For example, a user may register a new place by accessing a client application to define a place name and provide a geographic location and cause the newly created place to be registered in location database 104. As discussed above, a created place may correspond to a hub node, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi or GPS capabilities can be identified by cell tower triangulation, Wi-Fi positioning, or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, additional information of a place can be business hours, photos, advertisements, or user reviews of the place. In particular embodiments, location database 104 may store a user's location data. For example, a user can create a place (e.g., a new restaurant or coffee shop) and the social-networking system can store the created place in location database 104. For example, location database 104 may store a user's check-in activities. For example, location database 104 may store a user's geographic location provided by the user's GPS-equipped mobile device.

Figure 2:
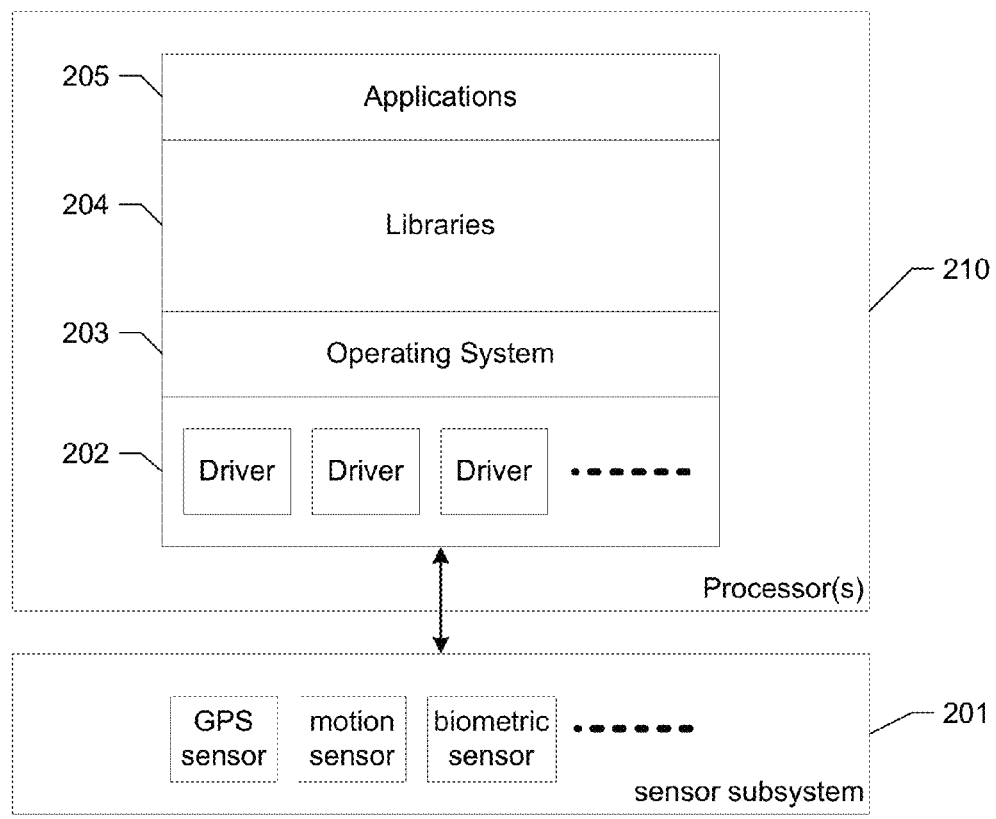
FIG. 2 illustrates an example processing stack of a mobile device with one or more sensor devices.

A mobile device system may comprise one or more sensor devices to provide additional inputs and facilitate multiple functionalities of the system. Processing of sensor inputs by a system with one or more sensor devices (for example, processing a GPS sensor signal and displaying in the device's graphical user interface a map of a location corresponding to the GPS sensor signal) may be implemented by a combination of hardware, software, or firmware (or device drivers). FIG. 2 illustrates an example processing stack of a mobile device (e.g., a smart phone) with one or more sensor devices. In the example of FIG. 2, sensor subsystem 201 of the mobile device can include one or more sensor devices, for example, a GPS sensor for location positioning, and a motion sensor for determining orientation of the mobile device, etc. One or more device drivers in driver layer 202 hosted by one or more processors 210 of the mobile device can communicate and control the one or more sensors of sensor subsystem 201. For example, a device driver can receive and process GPS signals generated by a GPS sensor. For example, one or more device drivers can receive and process sensor signals generated by multiple sensors in sensor subsystem 201. One or more processors 210 can host various software programs, for example, operating system 203 running one or more application programs (e.g., web browser, address book, etc.) in applications 205 and managing sensor subsystem 201 via the one or more device drivers in driver layer 202. Libraries 204 can include one or more libraries used by one or more application programs in applications 205. For example, a web browser application can access a mapping library (e.g., via a function call) that generates a map containing a GPS location obtained by a device driver interpreting a GPS signal from a GPS sensor, and display the map in the web browser application's graphical user interface.

One or more processors of a system, while not being active (i.e., not executing one or more programs), can enter a sleep state to reduce energy consumption by the system. For example, in an example sleep state, all computing states of a processor are saved in a main memory and the processor is powered off. In another example sleep state, a processor does not execute instructions during this state, but all computing states of the processor are still maintained in the processor (e.g., stored in the processor's cache).

Ordinarily, in order for a system comprising one or more sensors to access a sensor (or process a sensor signal) of the system, one or more processors of the system need to be in an active state to access the sensor via a device driver. For example, for a special-purpose client application hosted on a user's mobile device to continuously capture locations of the user and alert the user if the user is near one or more points of interest (i.e., locations that may be interesting or useful to the user) one or more processors of the mobile device need to be in an active state to access a GPS sensor driver as often as the sampling frequency of the continuous location capture (e.g., every five minutes), even when there is little movement by the user (e.g., the user is attending a meeting for the next two hours). Especially for mobile devices and other battery-powered devices, the one or more processors could be in a sleep state instead of being in the active state. This can cause unnecessary periods of the active state, or duty cycles, of the one or more processors of the mobile device, thus causing higher energy consumption and shorter battery life of the mobile device. Furthermore, many points of interests that a particular user may be near or pass by may not be relevant to that user. For example, if a particular user is in a metropolitan downtown area, there can be thirty points of interest within a half mile radius (e.g., coffee shops, restaurants, museums, etc.), but there may be one restaurant that is most relevant to the particular user—e.g., if three of the particular user's first-degree contacts had just checked in to the restaurant in the past 15 minutes. Instead of processing every point of interest that the particular user walks by, the one or more processors of the mobile device can be in a sleep mode until the particular user is near the restaurant, then wake up and alert the particular user about the presence of the three first-degree contacts. Particular embodiments herein describe methods of determining a set of locations relevant to a user, and dynamically determining processor duty cycle of the user's mobile device while continuously logging the set of locations with the mobile device's geographic-positioning device based on relevancy to the user. More specifically, particular embodiments may log the set of locations based on an affinity score corresponding to each location of the set of locations.

Particular embodiments utilize a geographic-positioning device of the mobile device that can be programmed to execute programs for controlling a geographic position sensing circuit, translating geographic-positioning signals from the geographic position sensing circuit to geographic locations, performing computations (e.g., calculating a distance between two geographic locations obtained from the geographic position sensing circuit, or determining whether a condition is met), and alerting the one or more processors of the mobile device if a condition is met (e.g., if a distance calculated is less than a pre-determined threshold). In some embodiments, the geographic-positioning device may comprise a geographic position sensing circuit that receives geographic-positioning signals (e.g., a GPS sensor), a memory, one or more lower-power processors that can be programmed to execute programs to control the geographic position sensing circuit and perform computations, and an interface circuit (e.g., I2C bus) that communicates with the one or more processors of the mobile device. In one embodiment, the geographic-positioning device may be implemented as a single module or a single integrated circuit situated within the mobile device, comprising the geographic position sensing circuit, the memory, and the one or more lower-power processors, operably coupled to the one or more processors of the mobile system via the interface circuit. In other embodiments, the geographic-positioning device may be incorporated into a sensor hub (such as the sensor subsystem of the mobile device illustrated in FIG. 2) comprising one or more sensor circuits that receive one or more sensor signals (including geographic-positioning signals such as GPS signals), a memory, one or more lower-power processors that can be programmed to control the sensor circuits and perform computations (such as calculating a distance between two geographic locations described above), and an interface circuit that communicates with the one or more processors of the mobile device. In one embodiment, the sensor hub may be implemented as a single module or a single integrated circuit situated within the mobile device, comprising the one or more sensor circuits, the memory, and the one or more lower-power processors, operably coupled to the one or more processors of the mobile device via the interface circuit.

Figure 3:
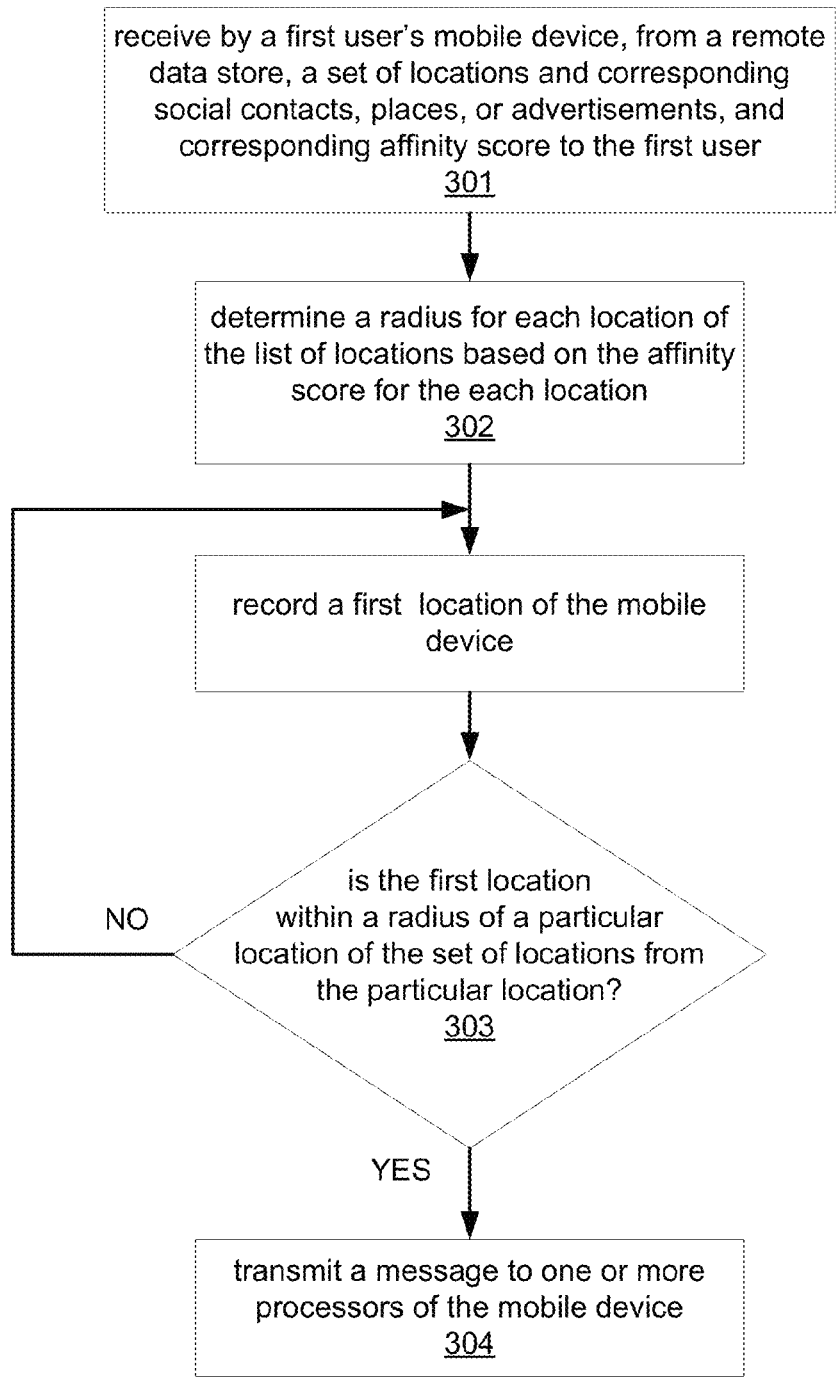
FIG. 3 illustrates an example method of location logging based on geographic-positioning signals.

FIG. 3 illustrates an example method of location logging based on affinity scores and geographic-positioning signals. The example method of FIG. 3 can be implemented by a user's mobile device with the geographic-positioning device described above, and a location recommendation process hosted by one or more computing devices of the social-networking system. In particular embodiments, a first user's mobile device may receive from a remote data store a set of locations and corresponding social contacts, places or advertisement, and corresponding affinity scores to the first user (301). In particular embodiments, the location recommendation process may determine the first user's current location. For example, the location recommendation process can access location database 104 for the first user's most recent check-in location, or a most recent GPS coordinates recorded by a special-purpose client application hosted by the first user's GPS-equipped cell phone. In particular embodiments, the location recommendation process may create a list of locations based on the first user's current location data. For example, the location recommendation process may access location database 104 for a list of locations within a pre-determined distance (e.g., two miles) from the first user's current location.

Additionally, in particular embodiments, the location recommendation process may assign an affinity score to each location of the list of locations based on relevancy to the first user. In particular embodiments, the location recommendation process may assign an affinity score to each location of the list of locations based on social proximity between the first user and one or more users associated with one or more locations of the list of locations. For each location of the list of locations, the location recommendation process may access user profile database 101 and location database 104, and identify one or more social contacts of the first user who are associated with the location, for example, a social contact who is currently at the location (e.g., base on place check-in data), a social contact who had checked in before to a place corresponding to the location, or a social contact who made comments about a place corresponding to the location. In particular embodiments, the location recommendation process may assign an affinity score to a first user's social contact and one or more locations associated with the social contact. For example, the location recommendation process can assign an affinity score of 1.0 if a social contact is the first user's immediate family member (e.g., parents, siblings). For example, the location recommendation process can assign an affinity score of 0.8 if a social contact is the first user's first-degree friend, and an affinity score of 0.7 if a social contact and the first user went to the same college during the same year. For example, the location recommendation process can assign an affinity score of 0.3 to a location if no first user's social contact is associated with the location. An example system for measuring user affinity is described more generally in U.S. patent application Ser. No. 11/503,093, filed 11 Aug. 2006, which is hereby incorporated by reference in its entirety and for all purposes. U.S. patent application Ser. No. 12/978,265, filed 23 Dec. 2010 and entitled "Contextually Relevant Affinity Prediction in a Social-networking system," which is incorporated by reference in its entirety and for all purposes, describes example methods of predicting user affinity based on actions a user may perform in the social-networking system. For example, the location recommendation process can calculate an affinity score between the first user and a social contact associated with a location (thus a measure of affinity between the first user and the location) by giving more weighting to location related actions (e.g., place check-in) than other actions (e.g., playing online social games).

In particular embodiments, the location recommendation process may access location database 104 and advertising content database 105 to identity one or more advertisements corresponding to one or more locations from the list of locations. An example system of measuring user relevancy of advertisements based on category, location, time of delivery, previous actions, and common interests with social contacts is described more generally in U.S. patent application Ser.

No. 12/977,027, filed 22 Dec. 2010 and entitled "Providing Relevant Notifications for a User Based on Location and Social Information," which is incorporated by reference in its entirety and for all purposes. For example, the location recommendation process can assign an relevancy score between the first user and an advertisement and a corresponding location (from the list of locations), e.g., 1.0 for most relevant advertisements, 0.7 for less relevant advertisements, and 0.5 for locations with no corresponding advertisements. In particular embodiments, for each location of the list locations, the location recommendation process may adjust its affinity score by its relevancy score. For example, a particular location of the list of locations can have an affinity score of 0.8 and a relevancy score of 0.7, the location recommendation process may adjust the affinity score by multiplying the affinity score by the relevancy score, thus the adjusted affinity score can be 0.8*0.7=0.56.

In particular embodiments, the location recommendation process may store the list of locations for the first user in a data store (e.g., location database 104). In particular embodiments, the location recommendation process may periodically update the list of locations for the first user. For example, the location recommendation process can update the list of locations for the first user every hour during day time and every three hours during night time for the first user, and store the list of locations in location database 104. In other embodiments, the location recommendation process may periodically access the first user's current location data, and update the list of locations if the first user has moved beyond (or almost beyond) a geographic area covering locations of the list of locations.

In particular embodiments, the location recommendation process may access the data store and transmit a set of location comprising one or more locations of the list of locations, and corresponding social contacts, places or advertisements, and corresponding affinity score to the first user, to the first user's mobile device. For example, the location recommendation process may access the data store, rank the list of location based on affinity scores (e.g., locations with highest affinity scores are ranked to the top of the list), and transmit top N ranked locations of the ranked list of locations, and corresponding social contacts, places, or advertisements, and corresponding affinity score to the first user, to the first user's mobile device. For example, the value of N may depend on the size of available local storage of the first user's mobile device. In other embodiments, a special-purpose client application hosted by the first user's mobile device may access location database 104, retrieve top N ranked locations of the ranked list of locations and corresponding social contacts, places or advertisements, and corresponding affinity score to the first user, and store the retrieved locations in a local storage of the mobile device.

The example method of FIG. 3 utilizes a radius for each location of the set of locations to determine whether the first user is near one or more locations relevant to the user based on geographic-positioning signals obtained by the first user's mobile device, and alert or wake up one or more processors of the mobile device to process if the first user is near one or more locations relevant to the user. In particular embodiments, the first user's mobile device (e.g., a mobile phone, netbook, smartphone, tablet, or other portable device) may comprise one or more processors and a geographic-positioning device (or a sensor hub as described above).

Figure 4:
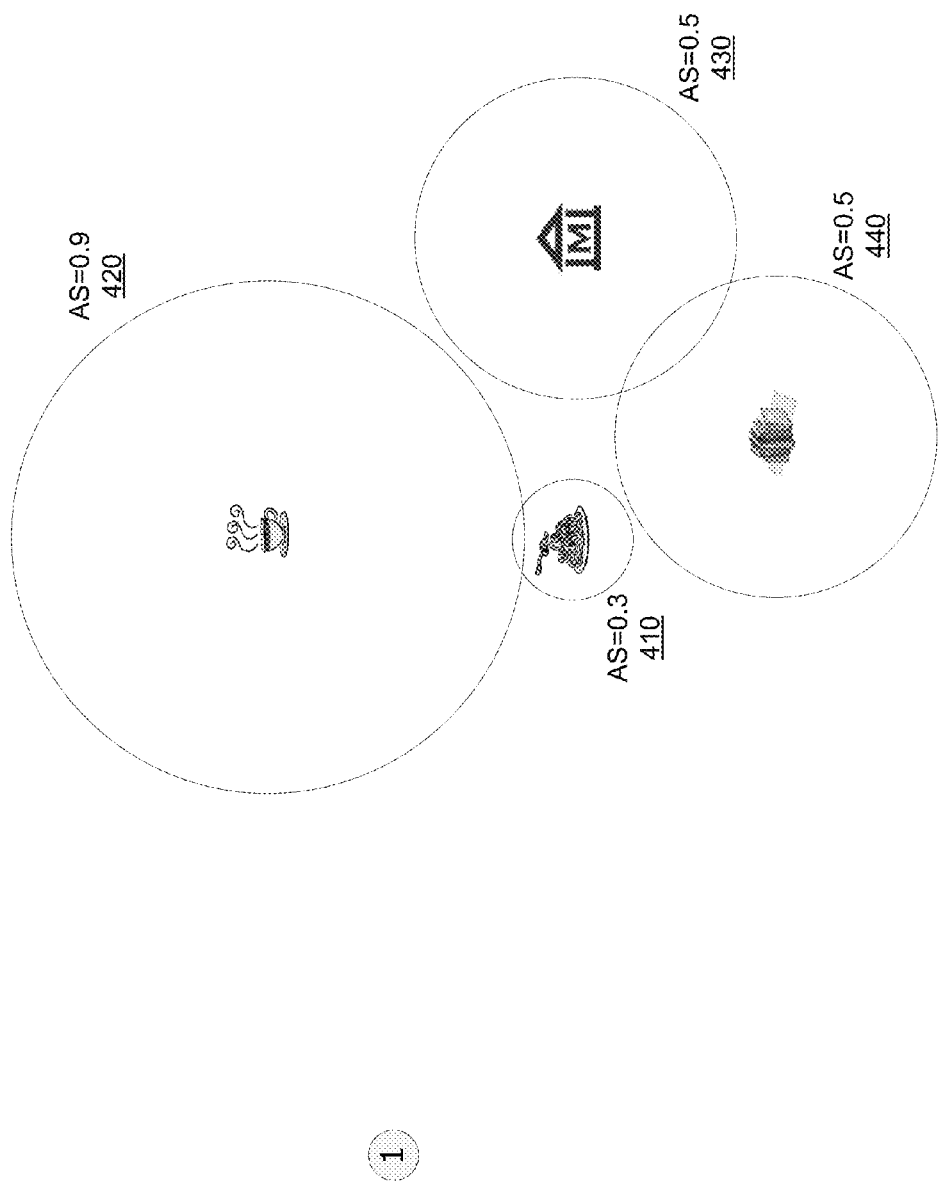
FIG. 4 illustrates example radii for the example method of FIG. 3.

In particular embodiments, the geographic-positioning device may determine a radius for each location of the set of locations based on corresponding affinity score to the first user. FIG. 4 illustrates example radii for the example method of FIG. 3. In the example of FIG. 4, a first user is at location "1" and the set of location comprises four nearby locations relevant to the first user, each with a corresponding affinity score to the first user: a restaurant 410 with an affinity score of 0.3, a coffee shop 420 with an affinity score of 0.9, a museum 430 with an affinity 0.5, and a bookstore 440 with an affinity score of 0.5. The geographic-positioning device may assign a larger radius for a location with a higher affinity score, that is, a particular location with a higher affinity score may have a larger radius (than other locations) to notify (or "broadcast) its presence to the first user since the particular location is more relevant to the first user (than other locations). For example, the geographic-positioning device can assign a radius of a half mile to coffee shop 420 (affinity score=0.9), a radius of a quarter mile to coffee museum 430 and bookstore 440 (affinity score=0.5), and a radius of 500 feet to restaurant 410 (affinity score=0.3).

In some embodiments, the geographic-positioning device may adjust the radius of each location of the set of locations based on a velocity of the mobile device (302). For example, if a user is walking with a velocity of 3 miles per hour, the geographic-positioning device can determine a radius for each location of the set of locations as illustrated in the example of FIG. 4. If a user has a higher velocity (e.g., the user is driving at 30 miles per hour), the geographic-positioning device can increase each radius by three times so that there is enough time to alert the user about a relevant location. In some embodiments, if a user is stationary (e.g., the user is watching a movie at home), the geographic-positioning device may assign a pre-determined value to each radius (e.g., 500 feet) since there is no need to alert the user about a new relevant location.

In some embodiments, the geographic-positioning device may determine a velocity of the mobile device based on recent location data stored locally at the mobile device. In some embodiments, the geographic-positioning device may determine a default velocity (e.g., 3 miles per hour) if no recent location data is available.

In some embodiments, the geographic-positioning device may adjust the radius of each location of the set of locations based on time of day. For example, the geographic-positioning device can access time of day information via a system call. For example, the geographic-positioning device can assign a smaller radius (e.g., a quarter mile) for each location of the set of locations if the time of day information corresponds to an evening hour (e.g., between 10 PM to 6 AM) since the first user is likely to have less movement. In other embodiments, the geographic-positioning device may adjust the radius of each location of the set of locations based on a power budget available for the mobile device. For example, an operating system or an application program hosted by the mobile device can access battery level information (e.g., via a function call) and transmit the battery level information to the geographic-positioning device. For example, if the mobile device's battery level is less then a pre-determined threshold (e.g., 20% of full capacity), the geographic-positioning device may reduce the radius for each location of the set of locations by 50 percent so that there is less frequent detection of relevant locations, thus reducing power consumption and preserving remaining battery power. Yet in another embodiment, the geographic-positioning device may adjust the radius of each location of the set of locations based on an error associated with recording one or more locations. An error associated with one or more recorded locations may depend on one or more sources of the recording (e.g., GPS, cell-tower triangulation, etc.), movement of the mobile device, time of the recording, etc. For example, to avoid erroneous detection of location changes, the geographic-positioning device can obtain an accuracy distance, e.g., a horizontal distance greater than the error associated with the one or more recorded locations, and determine a minimal radius for each location of the set of locations as at least two times of the accuracy distance. In particular embodiments, the geographic-positioning device may determine a radius based on multiple factors, such as affinity score, time of day, power budget, or errors associated with each location of the set of locations described above. For example, the geographic-positioning device can determine a radius based on a weighted average of radii determined by each individual factor. For example, the geographic-positioning device can determine a radius based on power budget only if the mobile device's battery level is very low (e.g., 10% of full capacity). In some embodiments, one or more client applications hosted by the one or more processors of the mobile system may determine a radius of each location of the set of locations based on affinity score, velocity, time of day, power budge, or errors associated with recorded locations. For example, a special-purpose client application for continuously logging relevant locations to a user can determine a radius of each location of the set of locations based on the corresponding affinity scores to the first user, and provide the radius to the geographic-positioning device. In some embodiments, the one or more client applications may determine a radius based on multiple factors, such as affinity score, velocity, time of day, power budget, or errors associated with recorded locations.

In particular embodiments, the geographic-positioning device may record a first location at a pre-determined frequency (e.g., every 30 seconds, one minute, five minutes, etc.), and determine if for at least a particular location of the set locations, the first location is within a region defined by the radius for the particular location extending from the particular location (303). That is, the geographic-positioning device may look for whether the user has entered the region(s) surrounding one or more locations of the set of locations.

In particular embodiments, if the first location is within the region defined by the radius for at least the particular location extending from the particular location, the geographic-positioning device may transmit a message to the one or more processors of the mobile device (304). In particular embodiments, the message may comprise the particular location. In particular embodiments, the message may cause at least one of the one or more processors to transition from a sleep state to an active state.

Additionally, the geographic-positioning device may continue the example method of FIG. 3. For example, the geographic-positioning device may continue to record a first location and determine if the first location is within a region defined by a radius for a particular location (from the set of locations) extending from the particular location (303), or the first user's mobile device may receive from a remote data store a new set of locations and corresponding social contacts, places or advertisement, and corresponding affinity scores to the first user (301).

Figure 4A:
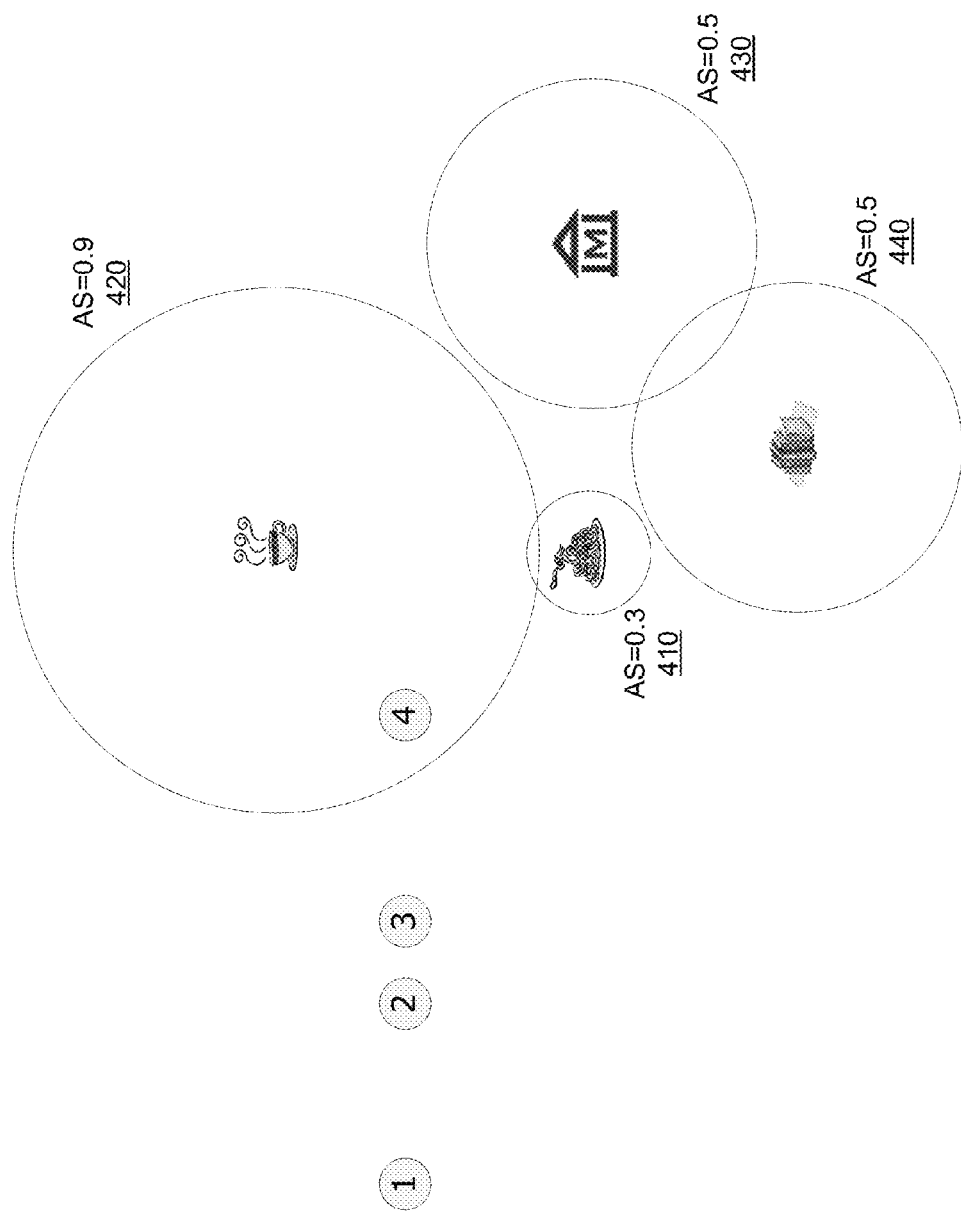
FIG. 4A illustrates example movement of a user.
Figure 5:
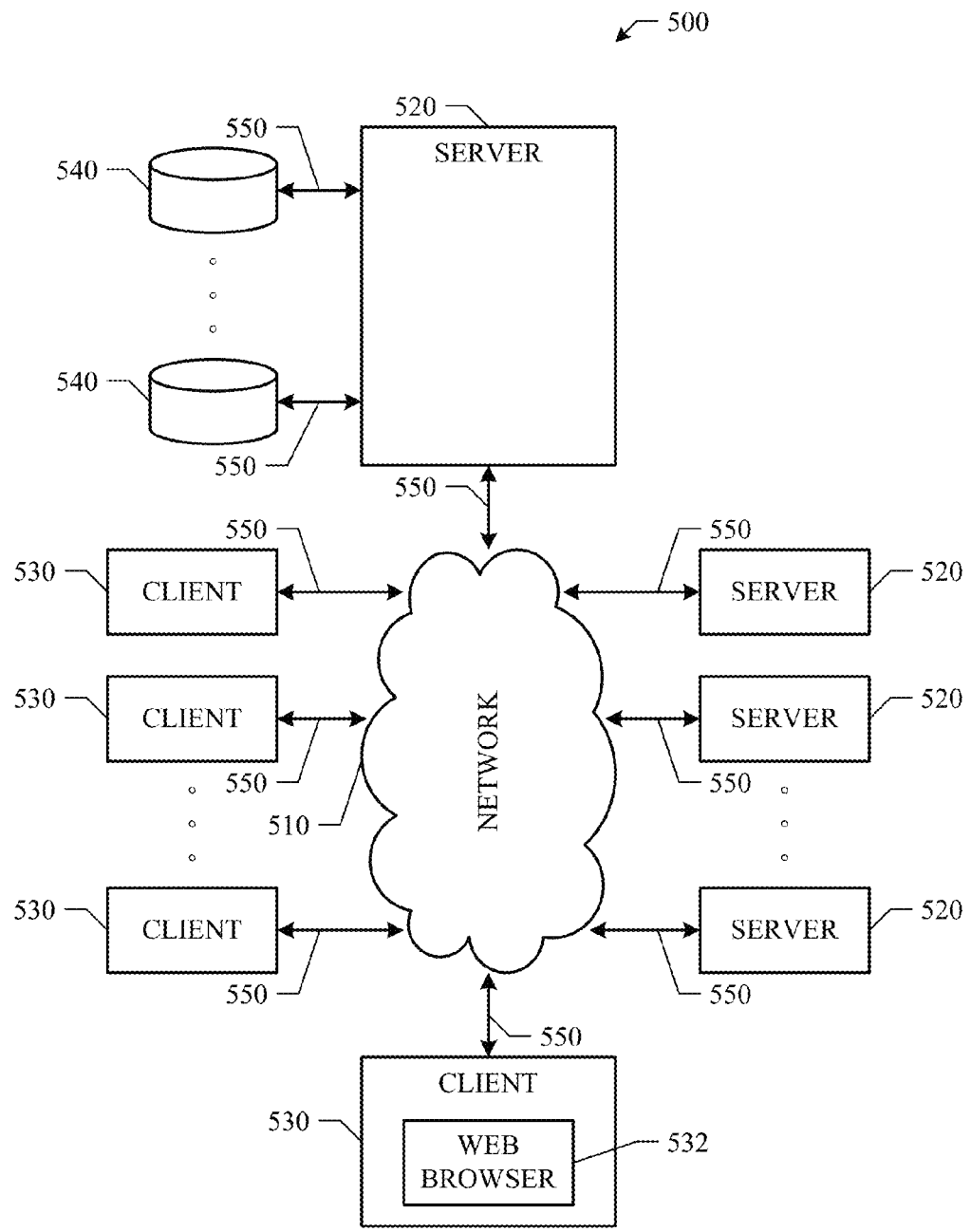
FIG. 5 illustrates an example network environment.

The example method of FIG. 3 can be further illustrated by FIG. 4A. FIG. 4A illustrates a user's movement relative to the locations illustrated in FIG. 4. In the example of FIG. 4A, a first user carries a GPS-equipped mobile phone is at location "1". A special-purpose client application hosted by one or more processors of the mobile phone can continuously capture the first user's locations (by accessing a GPS sensor of the mobile phone via a device driver) and alert the first user nearby points of interests as the first user moves, at an interval of every five minutes. Ordinarily, one or more processors of the mobile device is active at least every five minutes in order to access the GPS sensor and determine presence of points of interests nearby. In contrast, with the example method of FIG. 3, the special-purpose client application can access location database 104 and receive a set of locations relevant to the first user (restaurant 410, coffee shop 420, museum 430, and bookstore 440), and a corresponding affinity score for each location. The special-purpose client application can instruct a sensor hub comprising a GPS sensor and other sensors, a memory, one or more lower-power processors and an interface circuit communicating with the one or more processors of the first user's mobile device, to determine a radius for each location based on the affinity score for each location (as illustrated in FIG. 4), and start recording a first location (location "1" in FIG. 4A), and if there is no other programs running on the one or more processors at the time, the one or more processors can enter a sleep state. The sensor hub can continue to record locations of the first user every five minutes, and determine whether the first user has entered one or more regions defined by the radius of each location. For example, if the first user walks down a street and has not enter one or more regions defined by the one or more radii, as illustrated by locations "2", and "3" in FIG. 4A, the sensor hub with the one or more lower-power processors, which may consume substantially lower power than the one or more processors of the mobile device, can continue to record the first user's locations every five minutes while the one or more processors of the mobile device are at the sleep state. In the example of FIG. 4A, if the sensor hub determines that the user has entered the region defined by the radius for location 420 (the coffee shop), as illustrated by location "4" in FIG. 4A, the sensor hub can transmit a message comprising location 420, causing at least one of the one or more processors transition from the sleep state to an active state, and execute the special-purpose client application to process location 420. For example, the special-purpose client application can present the first user a web page to check in the place corresponding to location 420 (the coffee shop). For example, the special-purpose client application can present to the first user an advertisement (e.g., a coupon) for the coffee shop. In the example of FIG. 4A, while the first user is at about the same distance from restaurant 410 and from coffee shop 420, as indicated by the recorded first locations "1", "2", "3", and "4", the special-purpose client application alerts the first user about coffee shop 420 first since coffee shop 420 has a higher affinity score and a larger radius than restaurant 410, and the first user enters the larger radius for coffee shop 420 first.

Figure 6:
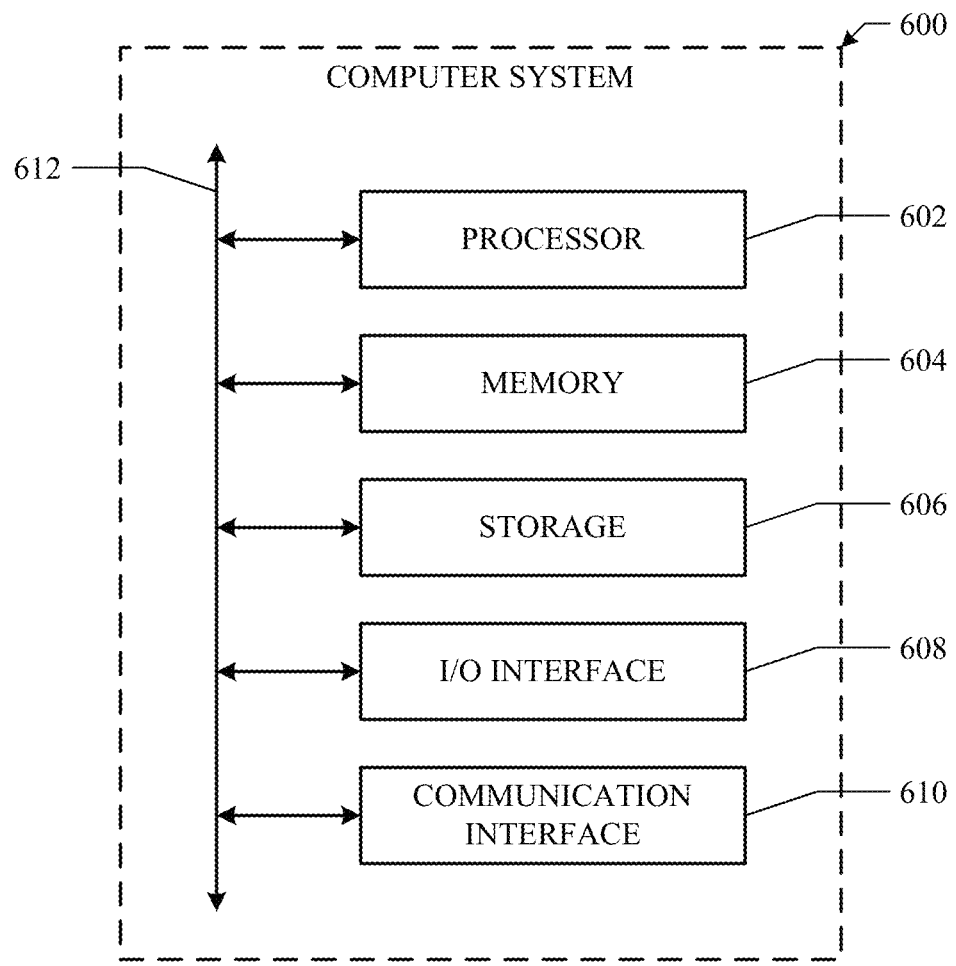
FIG. 6 illustrates an example computer system.

FIG. 6 illustrates an example computer system 600, which may be used in particular embodiments. This disclosure contemplates any suitable number of computer systems 600. In particular embodiments, computer system 600 includes a processor 602, memory 604, storage 606, an input/output (I/O) interface 608, a communication interface 610, and a bus 612. In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM).

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. Where appropriate, I/O interface 608 may include one or more device or software drivers enabling processor 602 to drive one or more of these I/O devices. I/O interface 608 may include one or more I/O interfaces 608, where appropriate.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, an SDRAM Controller (SDRC) bus, a General Purpose Input/Output (GPIO) bus, a Separate Video (S-Video) bus, a Display Serial Interface (DSI) bus, a Advanced Microcontroller Bus Architecture (AMBA) bus, or another suitable bus or a combination of two or more of these. Bus 612 may include one or more buses 612, where appropriate. Although this disclosure describes and illustrates a particular bus, this disclosure contemplates any suitable bus or interconnect.

Figure 7:
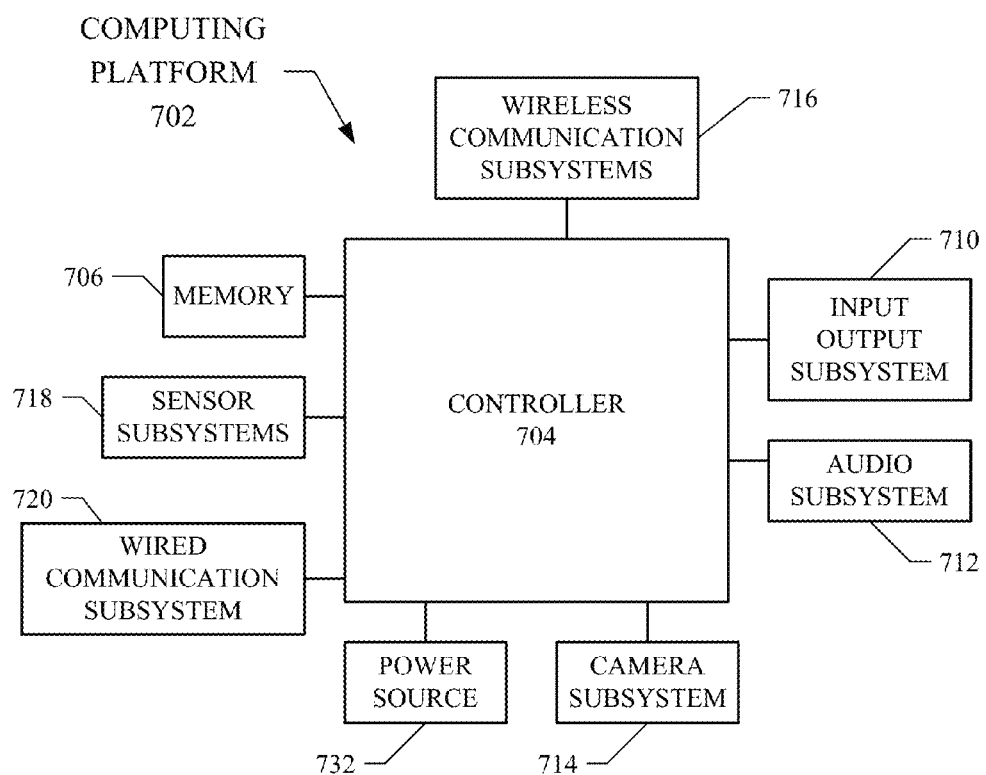
FIG. 7 illustrates an example mobile-device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 7 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors or one or more microcontrollers configured to execute instructions and to carry out operations associated with a computing platform. In various embodiments, controller 704 may be implemented as a single-chip, multiple chips, or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code, or data may be physically stored within memory 706 that is operatively coupled to controller 704.

Memory 706 may encompass one or more storage media and generally provide a place to store computer code (e.g., software or firmware) and data that are used by computing platform 702. By way of example, memory 706 may include various tangible computer-readable storage media including Read-Only Memory (ROM) or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 704.

Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input output subsystem may include keyboard, mouse, one or more buttons, thumb wheel, or display (e.g., liquid crystal display (LCD), light emitting diode (LED), Interferometric modulator display (IMOD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touch pad and touch screen. A touchpad is an input device including a surface that detects touch-based inputs of users. Similarly, a touch screen is a display that detects the presence and location of user touch inputs. Input output system 710 may also include dual touch or multi-touch displays or touch pads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, or a Long Term Evolution (LTE) network).

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, or biometric sensor for security application (e.g., fingerprint reader). Other input/output devices may include an accelerometer that can be used to detect the orientation of the device. In particular embodiments, various components of computing platform 702 may be operably connected together by one or more buses (including hardware or software). Additionally, computing platform 702 may be powered by power source 732.

Herein, reference to a computer-readable non-transitory storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The present disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:

receiving, at a mobile device, information on one or more entities socially connected to a user associated with the mobile device, the information comprising a location for each of the entities and an affinity score with respect to the user for each of the entities, the user being socially associated with the entities through an on-line social network;

determining on a periodic basis, by one or more processors of a geographic-positioning component of the mobile device, a current location of the mobile device;

determining, for each of one or more of the entities, a radius from the location of the entity based at least in part on the affinity score for the entity;

determining, by the processors of the geographic-positioning component, whether the current location is within an area defined by one of the radii; and if the current location is within the one of the radii, then transmitting by the processors of the geographic-positioning component a message to one or more other processors of the mobile device, the message causing one or more of the other processors to transition from a sleep state to an active state.

2. The method of claim 1, wherein the radius from the location of the entity is determined based at least in part on a velocity of the mobile device in addition to the affinity score for the entity.

3. The method of claim 1, wherein the radius is determined based at least in part on a velocity of the mobile device.

4. The method of claim 3, wherein the velocity of the mobile device is determined based at least in part on a location of the mobile device.

5. The method of claim 3, wherein the velocity of the mobile device is determined based at least in part on a default velocity.

6. The method of claim 1, wherein the radius is determined based at least in part on a time of day.

7. The method of claim 1, wherein the radius is determined based at least in part on a power budget of the mobile device.

8. The method of claim 1, wherein the radius is determined based at least in part on an error associated with the location of an entity or the current location.

9. The method of claim 1, wherein the message identifies the current location.

10. The method of claim 1, wherein the location of an entity or the current location is based at least in part on:
 a global positioning system (GPS) signal;
 a Wi-Fi signal; or
 a cellular radio signal.

11. One or more computer-readable non-transitory storage media within a mobile device, the media embodying logic that is operable when executed to:

receive information on one or more entities socially connected to a user associated with the mobile device, the information comprising a location for each of the entities and an affinity score with respect to the user for each of the entities, the user being socially associated with the entities through an on-line social network;

determine on a periodic basis a current location of the mobile device;

determine, for each of one or more of the entities, a radius from the location of the entity based at least in part on the affinity score for the entity;

determine whether the current location is within an area defined by one of the radii; and if the current location is within one of the radii, then transmit a message to one or more processors of the mobile device, the message causing one or more of the processors to transition from a sleep state to an active state.

12. The media of claim 11, wherein the radius from the location of the entity is determined based at least in part on a velocity of the mobile device in addition to the affinity score for the entity.

13. The media of claim 11, wherein the radius is determined based at least in part on a velocity of the mobile device.

14. The media of claim 13, wherein the velocity of the mobile device is determined based at least in part on a location of the mobile device.

15. The media of claim 13, wherein the velocity of the mobile device is determined based at least in part on a default velocity.

16. The media of claim 11, wherein the radius is determined based at least in part on a time of day.

17. The media of claim 11, wherein the radius is determined based at least in part on a power budget of the mobile device.

18. The media of claim 11, wherein the radius is determined based at least in part on an error associated with the location of an entity or the current location.

19. The media of claim 11, wherein the message identifies the current location.

20. The media of claim 11, wherein the location of an entity or the current location is based at least in part on:
 a global positioning system (GPS) signal;
 a Wi-Fi signal; or
 a cellular radio signal.

* * * * *